United States Patent
Gabrielsson

(10) Patent No.: US 10,898,855 B2
(45) Date of Patent: Jan. 26, 2021

(54) METHOD AND SYSTEM FOR THE REMOVAL OF NOXIOUS COMPOUNDS FROM FLUE-GAS USING FABRIC FILTER BAGS WITH AN SCR CATALYST

(71) Applicant: Haldor Topsoe A/S, Kgs. Lyngby (DK)

(72) Inventor: Pär L. T. Gabrielsson, Helsingborg (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/608,679

(22) PCT Filed: Apr. 5, 2018

(86) PCT No.: PCT/EP2018/058747
§ 371 (c)(1),
(2) Date: Oct. 25, 2019

(87) PCT Pub. No.: WO2018/197176
PCT Pub. Date: Nov. 1, 2018

(65) Prior Publication Data
US 2020/0188849 A1 Jun. 18, 2020

(30) Foreign Application Priority Data

Apr. 26, 2017 (DK) .................. 2017 00265
May 2, 2017 (DK) .................. 2017 00278

(51) Int. Cl.
*B01D 53/86* (2006.01)
*B01D 46/02* (2006.01)
*B01D 46/00* (2006.01)

(52) U.S. Cl.
CPC ....... *B01D 53/869* (2013.01); *B01D 46/0027* (2013.01); *B01D 46/02* (2013.01); *B01D 53/8631* (2013.01); *B01D 53/8634* (2013.01); B01D 2251/2062 (2013.01); B01D 2251/2067 (2013.01); B01D 2255/1021 (2013.01); B01D 2255/1023 (2013.01); B01D 2255/915 (2013.01)

(58) Field of Classification Search
CPC ............. B01D 53/8631; B01D 53/869; B01D 2251/2067; B01D 53/8634; B01D 2258/0283; B01D 46/02; B01D 2251/2062; B01D 2255/915; B01D 46/0027; B01D 53/56; B01D 53/565; B01D 2257/404; C01B 17/40; C01B 17/46; C01B 17/42
See application file for complete search history.

(56) References Cited

U.S. PATENT DOCUMENTS

| | | | |
|---|---|---|---|
| 4,309,386 A | 1/1982 | Pirsh | |
| 4,732,879 A | 3/1988 | Kalinowski et al. | |
| 5,051,391 A * | 9/1991 | Tomisawa | B01J 23/22 502/242 |
| 5,288,299 A * | 2/1994 | Yoshida | B01D 46/0036 55/302 |
| 5,585,081 A * | 12/1996 | Chu | B01D 53/8637 422/171 |
| 6,331,351 B1 * | 12/2001 | Waters | B01D 53/885 422/177 |
| 2010/0181530 A1 * | 7/2010 | Kneuper | C01B 21/262 252/182.34 |
| 2011/0041481 A1 | 2/2011 | Fujita | |
| 2011/0200505 A1 | 8/2011 | Cavataio et al. | |
| 2011/0229391 A1 * | 9/2011 | Paulus | B01D 53/9468 423/213.2 |
| 2011/0271664 A1 * | 11/2011 | Boorse | B01D 53/9468 60/301 |
| 2013/0149225 A1 | 6/2013 | Schwefer et al. | |
| 2015/0336051 A1 | 11/2015 | Brückner et al. | |

FOREIGN PATENT DOCUMENTS

| | | | | |
|---|---|---|---|---|
| EP | 3 135 878 A1 | 3/2017 | | |
| EP | 3 426 392 A1 * | 1/2019 | ......... | B01D 53/8631 |
| JP | 11-128686 A | 5/1999 | | |

* cited by examiner

Primary Examiner — Timothy C Vanoy
(74) Attorney, Agent, or Firm — Blank Rome LLP

(57) ABSTRACT

Method and system for the removal of nitrogen oxides, from flue gas at low temperatures.

9 Claims, No Drawings

METHOD AND SYSTEM FOR THE REMOVAL OF NOXIOUS COMPOUNDS FROM FLUE-GAS USING FABRIC FILTER BAGS WITH AN SCR CATALYST

The present invention relates to a method and system for reducing emission particulate matter and nitrogen oxides (NOx) from off-gasses and flue gases. In particular, the method and system of the invention provides an improved reduction of NOx at low gas temperatures.

Flue gases from different combustion facilities, e.g. boilers in solid or liquid fired power plants gas, oil-fired generators or cement kilns, biofuel fuelled combustion plants and waste incineration plants contain a number of environmentally problematic or even poisonous compounds. These comprise particulate matter and NOx.

Use of particulate filters and catalytic cleaning of flue gas reduces the amount of particulate matter and NOx and is therefore beneficial for the environment in general. In most areas, legislation requires reduction of NOx in the flue gas.

Fabric filter bags are extensively used in many industries for removal of particulate matter from flue and process gases. They are the most efficient types of dust collectors.

As mentioned above, off and flue gases very often contain a plurality of pollutants, inter alia nitrogen oxides in concentrations that have to be removed or reduced depending on local legislation. For this purpose, several conventional methods are available. In all cases additional units up/downstream the fabric filter bags have to be installed and operated.

In assignees co-pending patent application US 2017/0080387, which by reference thereto is included herein in its entirety, filter bags catalysed with SCR active catalysts are disclosed. These filter bags reduce or remove the NOx concentration and particulate matter, when the off or flue gas passes through the filter bags.

Due to the composition of fibers constituting the filter bags, these must be operated at temperatures lower than 250° C.

In Selective Catalytic Reduction (SCR) of NOx, nitrous oxide compounds are selectively reduced to harmless nitrogen and water by reaction with a reduction agent, e.g. ammonia, over a catalyst.

The low gas temperature required by the filter bag composition encounters a problem in the NOx removal by means of SCR.

The problem with the known SCR catalysts is the relatively low efficiency at gas temperatures below 250° C.

This invention is based on forming $NO_2$ externally to the flue gas duct and injecting the prepared $NO_2$ into the flue gas in an amount that promotes the so called "fast" SCR reaction. $NO_2$ can be formed from $NH_3$ by oxidation of the $NH_3$ to NO over a precious metal containing catalyst in a first step and subsequently oxidation of NO to $NO_2$ in a second step.

It is known that the SCR reaction can be considerably accelerated, and the low temperature activity can be significantly raised at equimolar amounts of NO and $NO_2$ in the flue gas by the "fast" SCR reaction:

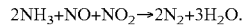

$$2NH_3+NO+NO_2 \rightarrow 2N_2+3H_2O.$$

Thus, the invention provides in a first aspect a method for the removal of nitrogen oxides from flue gas from combustion facilities, comprising the steps of passing the flue gas through one or more fabric filter bags catalysed with a catalyst for selective reduction of nitrogen oxides in presence of ammonia added to the flue gas either as such or in form of a precursor thereof;

injecting an effluent gas containing nitrogen dioxide into the flue gas upstream the one or more fabric filter bags;

providing the effluent gas containing nitrogen dioxide by steps of catalytically oxidizing ammonia or a precursor thereof with an oxygen containing atmosphere to an effluent gas containing nitrogen monoxide and oxygen in presence of an oxidation catalyst;

cooling the effluent gas to ambient temperature and oxidizing the nitrogen monoxide in the cooled effluent gas to the nitrogen dioxide containing effluent gas.

The problem with the known methods and systems is the relatively low efficiency of the SCR catalyst at flue gas temperatures below 250° C., as mentioned hereinbefore. This problem is solved by the invention with injection of $NO_2$ into the flue gas at the low temperatures to promote the "fast" SCR reaction. This reaction is responsible for the promotion of low temperature SCR.

At flue gas temperatures above 250° C., SCR catalysts have sufficient efficiency and injection of $NO_2$ into the flue gas can be disrupted when the gas temperature reaches 250° C.

Ammonia oxidation to NO externally to the flue gas duct, is usually performed in a reactor with a noble metal catalyst, typically platinum or an alloy of platinum with other precious metals as minor components at reaction temperatures of between 250 and 800° C. in presence of oxygen containing atmosphere.

To provide the required reaction temperature, the oxidation reactor can be heated by e.g. electrical heating or induction heating.

In an embodiment, the oxygen containing atmosphere includes hot recirculated gas which provides then additionally part of the oxidation reactor heating duty.

NO formed from $NH_3$ in a first step by oxidation of the $NH_3$ in contact with a precious metal containing catalyst is subsequently oxidized to $NO_2$ in the NO containing effluent gas from the first step by cooling the gas to ambient temperature to push the equilibrium reaction $2NO+O_2 \rightleftharpoons 2NO_2$ towards formation of $NO_2$.

The term "ambient temperature" as used herein, shall mean any temperature prevailing in the surroundings of a combustion facility employing the method and system of the invention. Typically, the ambient temperature will be between −20° C. and 40° C.

Cooling and oxidation of the NO containing effluent gas can be performed in an aging reactor sized so that the residence time of the gas is about 1 minute or longer.

In an embodiment the oxidation reaction is performed in presence of a catalyst promoting the oxidation of NO to $NO_2$. Those catalysts are known in the art and include Pt on $TiO_2$, Pt on $SiO_2$ and activated carbon or Pt and/or Pd on alumina.

As mentioned hereinbefore the desired fast SCR reaction requires equal amounts of NO and $NO_2$. Consequently, the amount of $NO_2$ injected into the flue gas at a temperature below 250° C. is controlled to result in 45 to 55% by volume of the nitrogen oxides content in the flue gas is $NO_2$ at inlet to the SCR catalyst unit.

In another aspect, the invention provides a system for use in the method according to the invention.

The system comprises within a flue gas duct a filter bag house with one or more fabric filter bags catalysed with a catalyst for selective reduction of nitrogen oxides;

upstream the one or more fabric filter bags or the filter bag house injection means for injection of ammonia or a urea solution into the flue gas duct;

upstream the one or more fabric filter bags or the filter bag house, injection means for injection of nitrogen dioxide containing effluent gas; and outside the flue gas duct, an ammonia oxidation catalyst unit; and means for cooling and oxidizing nitrogen monoxide containing effluent gas withdrawn from the ammonia oxidation catalyst to the nitrogen dioxide containing effluent gas connected at its outlet end to the injection means for injection of the nitrogen dioxide containing effluent gas.

As mentioned above, the oxidation reaction of NO to $NO_2$ needs a residence time of the NO containing gas of at least 1 minute. Typically, 1-2 minutes.

This can be achieved in a heat exchanger either gas cooled or water cooled or alternatively when shaping the cooling and oxidizing means as a spirally wound tube with a length resulting in the desired residence time of the gas passing through the tube.

In another embodiment, the means for cooling and oxidizing nitrogen monoxide containing effluent gas is provided with an oxidation catalyst promoting the oxidation of NO to $NO_2$.

The invention claimed is:

1. A method for the removal of nitrogen oxides from flue gas from combustion facilities, comprising the steps of
    passing the flue gas through one or more fabric filter bags catalysed with a catalyst for selective reduction of nitrogen oxides in presence of ammonia added to the flue gas either as such or in form of a precursor thereof;
    injecting an effluent gas containing nitrogen dioxide into the flue gas upstream the one or more fabric filter bags;
    providing the effluent gas containing nitrogen dioxide by steps of catalytically oxidizing ammonia or a precursor thereof with an oxygen containing atmosphere to an effluent gas containing nitrogen monoxide and oxygen in presence of an oxidation catalyst;
    cooling the effluent gas to ambient temperature and oxidizing the nitrogen monoxide in the cooled effluent gas to the nitrogen dioxide containing effluent gas.

2. The method of claim 1, wherein the oxygen containing atmosphere comprises flue gas.

3. The method of claim 1, wherein the oxygen atmosphere is ambient air.

4. The method according to claim 1, wherein the nitrogen dioxide containing effluent gas is injected into the flue gas in an amount resulting in 45 to 55% by volume of the nitrogen oxides is nitrogen dioxide at inlet to the catalyst for selective reduction of nitrogen oxides.

5. The method according to claim 1, wherein the oxidation of the nitrogen monoxide in the cooled effluent gas to the nitrogen dioxide containing effluent gas is performed in presence of an oxidation catalyst.

6. System for use in the method according to claim 1, comprising within a flue gas duct a filter bag house with one or more fabric filter bags catalysed with a catalyst for selective reduction of nitrogen oxides;
    upstream the one or more fabric filter bags or the filter bag house injection means for injection of ammonia or a urea solution into the flue gas duct;
    upstream the one or more fabric filter bags or the filter bag house, injection means for injection of nitrogen dioxide containing effluent gas; and
    outside the flue gas duct,
    an ammonia oxidation catalyst unit; and
    means for cooling and oxidizing nitrogen monoxide containing effluent gas withdrawn from the ammonia oxidation catalyst to the nitrogen dioxide containing effluent gas connected at its outlet end to the injection means for injection of the nitrogen dioxide containing effluent gas.

7. The system of claim 6, wherein the means for cooling and oxidizing the nitrogen monoxide containing effluent gas is in form of a heat exchanger.

8. The system of claim 6, wherein the means for cooling and oxidizing the nitrogen monoxide containing effluent gas is in form of a spirally wound tube.

9. The system of claim 6, wherein the means for the cooling and oxidizing nitrogen monoxide containing effluent gas is provided with an oxidation catalyst.

* * * * *